United States Patent [19]

Hirayama

[11] Patent Number: 5,493,604
[45] Date of Patent: Feb. 20, 1996

[54] PORTABLE TELEPHONE SET WITH AUTOMATIC DIALING FEATURE

[75] Inventor: Syoji Hirayama, Tokyo, Japan

[73] Assignee: NEC Corporation, Tokyo, Japan

[21] Appl. No.: 242,841

[22] Filed: May 16, 1994

[30] Foreign Application Priority Data

May 14, 1993 [JP] Japan .................. 5-136843

[51] Int. Cl.⁶ .................................. H04Q 7/32
[52] U.S. Cl. ................. 379/58; 379/355; 379/433
[58] Field of Search ................. 379/58, 61, 355, 379/433; 455/89, 90

[56] References Cited

U.S. PATENT DOCUMENTS

| | | | |
|---|---|---|---|
| 4,800,584 | 1/1989 | Kitanishi | 379/355 |
| 4,897,873 | 1/1990 | Beutler et al. | 379/433 |
| 5,117,073 | 5/1992 | Mischenko | 379/433 |
| 5,175,759 | 12/1992 | Metroka et al. | 455/89 |
| 5,185,790 | 2/1993 | Mischneko | 379/433 |

*Primary Examiner*—Dwayne D. Bost
*Attorney, Agent, or Firm*—Sughrue, Mion, Zinn, Macpeak & Seas

[57] ABSTRACT

In a portable telephone set in which at least a part of telephone set is brought into an open state for talking as in a folding-up type portable telephone set, in order to eliminate complicated dialling operation to a predetermined subscriber, dial number information of the subscribers are previously stored in memory. When an automatic dial function is selected and the dial number information of the subscriber is selected, then on the open state of the telephone set, the dial number information of the subscribers, which is read from the memory, is automatically fed to the telephone network.

6 Claims, 3 Drawing Sheets

PORTABLE TELEPHONE SET WITH AUTOMATIC DIALING FEATURE

BACKGROUND OF THE INVENTION

1. Field of the Invention

This invention relates to a portable telephone set (handy phones) that is convenient to operate, and in particular to a portable telephone set such as folding-up type telephone set.

2. Description of the Prior Art

The portable telephone sets being carried on persons are now widely used and are capable of communicating with partners or subscribers freely from anywhere by radio. Among other things, a miniaturized folding-up type portable telephone set enjoys popularity among people.

One example of such folding-up type portable telephone set includes a receiving section having an antenna, an earpiece and a display, and a calling section having a mouthpiece provided on its surface with ten keys for dialling and various function buttons. The receiving section and the calling section are rotatably coupled to each other by a hinge so that both sections can be folded together during non-use, and in use, both sections are rotatably opened at a desired angle by the hinge.

In order to perform the dialling operation of the telephone set a start button is depressed after turning-on a power switch, and after confirmation of completion of a talking circuit. Then, automatic dialling operation starts. Some of the recent portable telephone sets have an automatic dialling function wherein automatic dialling operation starts only by depressing a call key for calling a partner's telephone number which is previously stored in a memory and then a start key.

Necessity often arises on business or for individual purposes for calling the same partner (subscriber) frequently, and repeated dialling operations are troublesome for everyone in the daily use of the portable telephone set.

SUMMARY OF THE INVENTION

It is an object of the present invention to provide a portable telephone set provided with a memory function which simplifies the calling of frequently dialed numbers to the same subscribers.

To achieve the object described above, a portable telephone set having a memory for storing dial number information of a predetermined subscriber, and an on talk, which is used with at least a part of the telephone set opened from its closed state, comprises a selecting means for selecting an automatic dial function; a detecting means for detecting an opened state of the telephone set; and a dial signal feed means for feeding to a telephone circuit network dial signal information of a predetermined subscriber which is read from the memory when an automatic dial function is selected by the selecting means and an opened state of the telephone set is detected by the detecting means.

According to the invention, with the functions described above, when the telephone set is opened, the predetermined subscriber's telephone number information stored in the memory is read and sent out automatically to the telephone network.

DETAILED DESCRIPTION OF THE PREFERRED EMBODIMENT

The invention will now be described with reference to the drawings.

Figure 1:
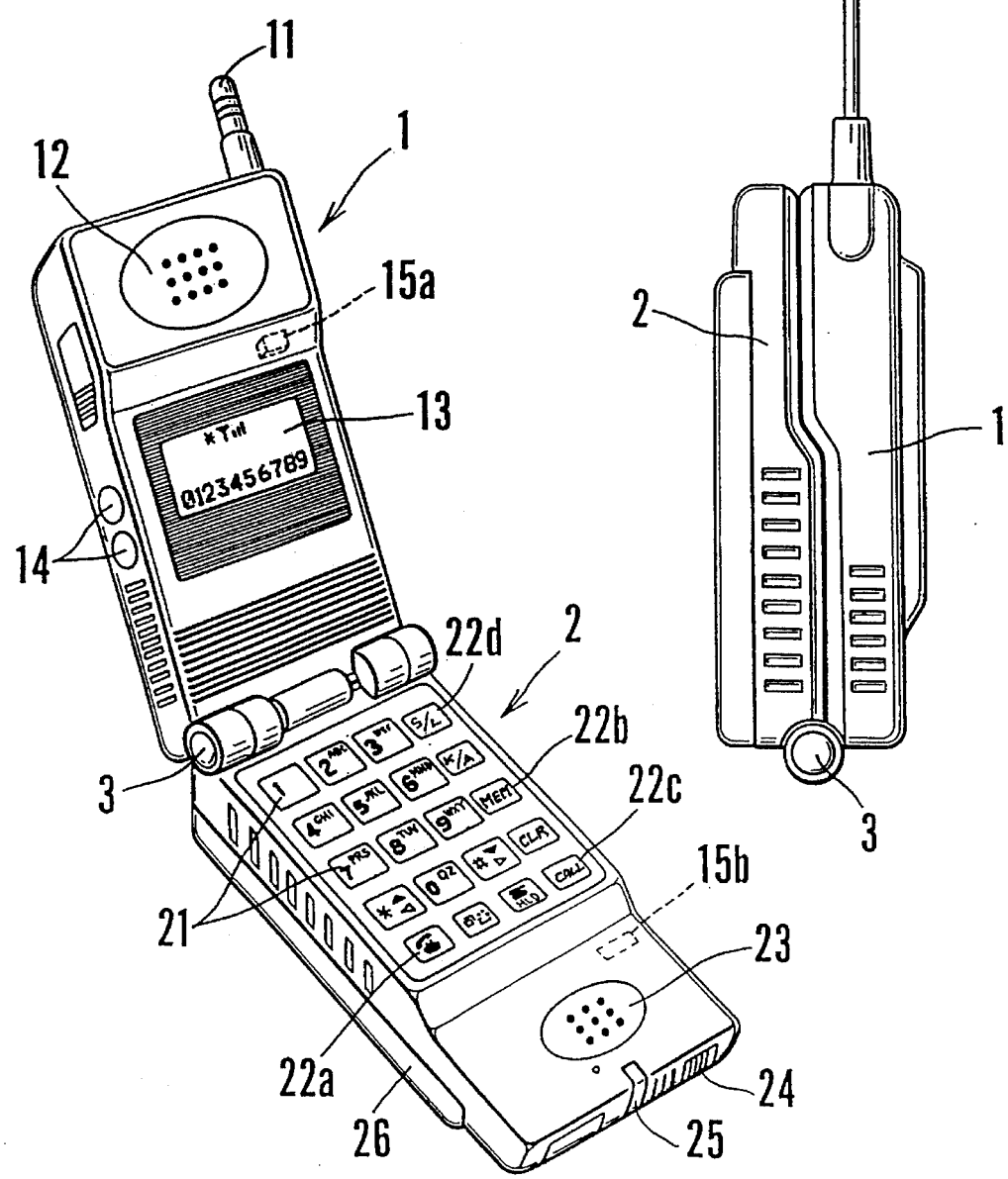
FIG. 1A is a perspective view showing a folding-up type portable telephone set according to the invention in a using (opened) state.
FIG. 1B is a side view showing the same in a non-using state (closed state)

FIG. 1A is a perspective view showing a folding-up type portable telephone set according to the invention, in a using state (opened), and FIG. 1B is a side view showing the same in a non-using state (closed state).

Referring to FIGS. 1A and 1B, a folding-up type portable telephone set (folding handy phone) consists of a receiving section 1 and a calling section 2 rotatably coupled by a hinge 3. A rod antenna 11 is extendably provided on the receiving section 1 and a mouthpiece 12 is provided on an upper front surface thereof. A liquid crystal display 13 is provided on a front center of the receiving section 1, and receiving sound volume adjust buttons 14 are provided on a side surface of the receiving section 1. In the calling section 2, dialling keys 21 and function buttons 22a, 22b, 22c, and 22d are provided on a front center thereof, an earpiece 23 on a lower front surface, and a power switch 24 and an incoming lamp 25 on a lower end side surface. A battery pack 26 is attached on a back of the calling section 2.

To detect opening of the receiving section 1 and the calling section 2 as shown in FIG. 1A, a magnetic piece 15a is provided inside a casing adjacent to the earpiece 12 of the receiving section 1, and a reed switch 15b is provided within the casing on a position corresponding to the magnetic piece 15a upon folding and adjacent to the mouthpiece 23 of the calling section 2. The magnetic piece 15a and the reed switch 15b form an open state detector. The reed switch 15b is turned off under the influence of the magnetic piece 15a when the receiving section 1 and the calling section 2 are folded together, and the reed switch 15b is turned on when the telephone set is opened.

The dialling operation of the present invention will now be described.

In an ordinary talk mode, the receiving section 1 and the calling section 2 are opened as shown in FIG. 1A, and then the power switch 24 is turned on and the start button 22a is depressed. If a calling tone is heard, it means that the telephone set is being connected to the line so that the talk mode is enabled. Then the ten keys 21 are depressed and the partner's (subscriber's) telephone number is dialled. Thereafter, the dialling operation is automatically performed.

In a talk mode utilizing the memory function, it is required to store the partner's (subscriber's) telephone number in a memory. For this purpose the power switch 24 is turned on and the subscriber's telephone number is inputted by the ten keys 21. After confirming the inputted telephone number which is displayed on the display 13 of the receiving section 1, the memory button 22b is depressed. There appears a message in the display 13 inquiring into which memory number of "00" to "99" the telephone number should be inputted. Then any required memory number (for example "01") is inputted by the ten keys 21 and thus the storage of the telephone number, i.e., the required dial number information for one subscriber is completed. The name of the subscriber may preferably be stored together with the telephone number by the ten keys 21. A plurality of subscriber's dial number information can be stored by repeating the same operation.

In a talk mode using this memory function, the power switch 24 is turned on and the call button 22c is depressed. Then the dial number information corresponding to a minimum memory number among the dial-number information stored in memory appears in the display 13. Dial number information stored in other memory numbers can be viewed in the display 13 by depressing another function button. When the required dial number information (telephone number, or telephone number and corresponding subscriber's name) appears in the display, the function button is released. Upon depression of the start button 22a, the dialling operation for the number appearing in the display is automatically started.

Figure 2:
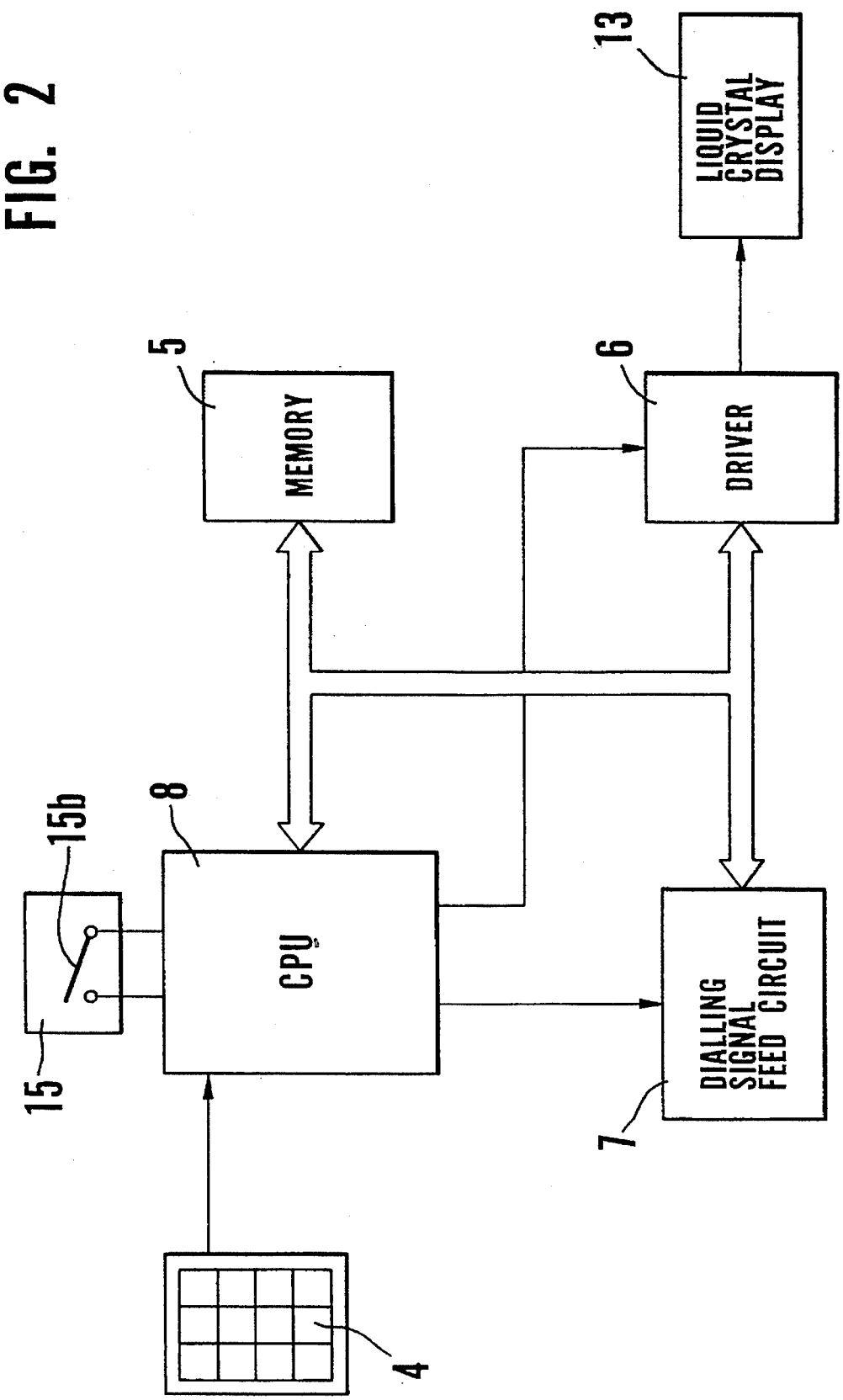
FIG. 2 is a block diagram of a folding-up type portable telephone set according to the invention.

FIG. 2 is a block diagram of a portable telephone set according to the invention.

Referring to FIG.2, numeral 4 depicts a key board comprising the ten keys 21, the function buttons 22a to 22d and other buttons provided on the front surface of the calling section 2. Numeral 5 is a memory (RAM) for storing the dial number information such as the telephone numbers and the subscriber's names and the like. 6 is a driver for driving a liquid crystal of the display 13 of the receiving section 1, and 7 is a dialling signal feed circuit for feeding dialling signals from the portable telephone set to the telephone network. Numeral 8 depicts a CPU for controlling operation of the driver 6 and the dialling signal feed circuit 7 for storing or reading the dial number information for the memory 5, the CPU 8 being connected with an open state detector 15 for detecting the open state of the portable telephone set.

Figure 3:
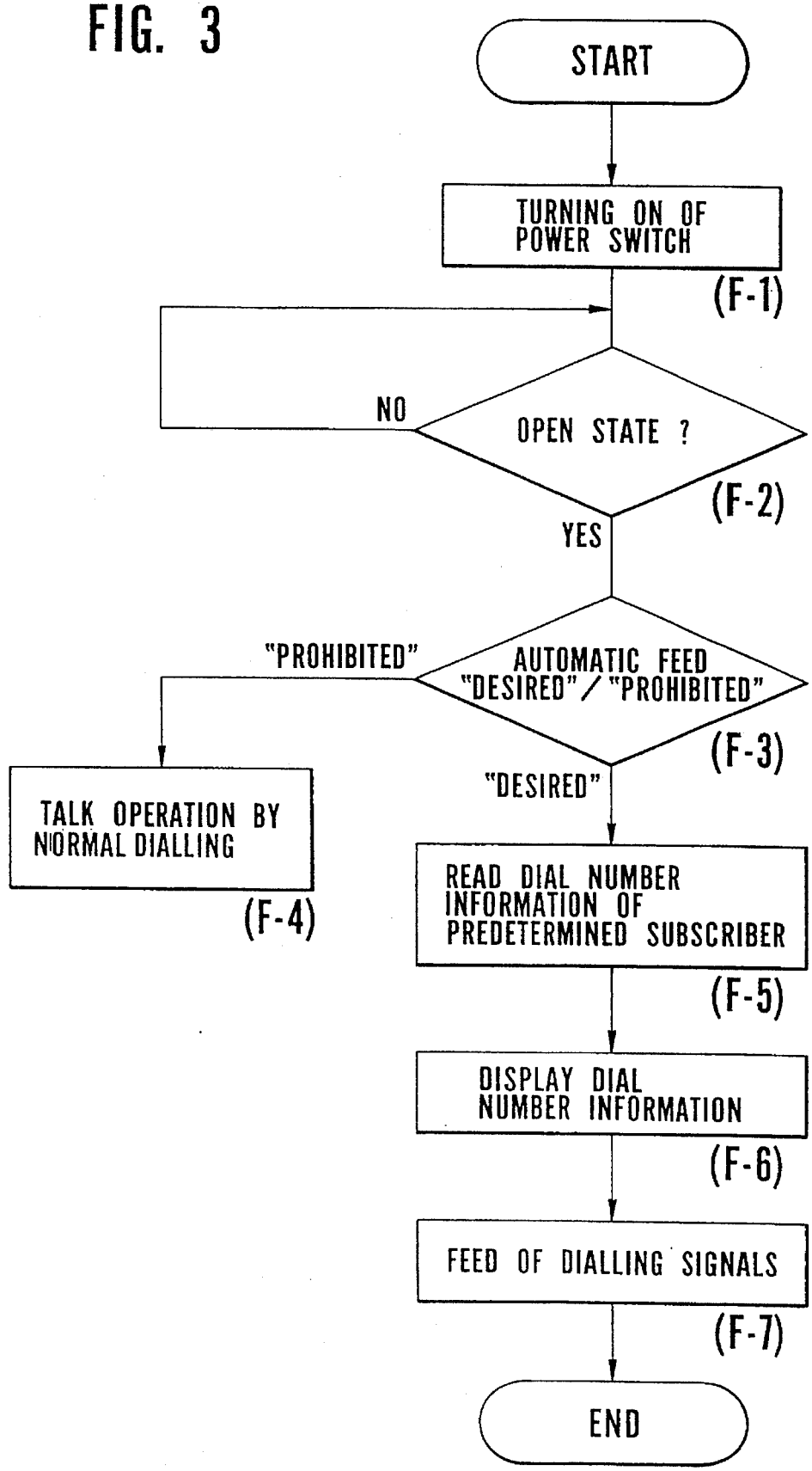
FIG. 3 is a flow chart of an automatic dialling operation of a portable telephone set according to the invention.

An automatic dialling operation of the portable telephone set according to the invention is described with reference to a flow chart in FIG. 3.

For an automatic dialling operation according to the invention, an automatic feed "DESIRED" of the dial signals which means that automatic feed of the dialling signals is desired has been previously selected using the key board 4, and the subscriber to be automatically dialled is previously determined. Such previous operation is performed using the ten keys 21 and the function button 22d on the key board 4 in the present embodiment. These data are stored into the memory 5.

After turning on the power switch 24 of the portable telephone set (F-1), a CPU 8 determines whether or not the telephone set is in an opened state on the basis of the ON/OFF condition of the open state detector 15 (F-2). Control proceeds to determine whether the automatic feed of the dial signals has been set to "DESIRED" or "PROHIBITED" (F-3). If the automatic feed is set to "PROHIBITED", then the control proceeds to normal talk operation (F-4). To the contrary, it the automatic feed is set to "DESIRED", then the dial number information of the predetermined subscriber previously stored in the memory 5 is read (F-5). Thus, read dial number information is displayed on the display 13 of the receiving section 1 by the driver 6 (F-6), fed to the dialling signal feed circuit 7, and further fed as a dialling signal to the telephone network through the antenna 11 from the dialling signal feed circuit 7 (F-7).

When the automatic feed "DESIRED" has been selected previously, then an user can automatically call the selected subscriber following the opening of the receiving section 1 and the calling section 2 of the telephone set without manual dialling operation.

In the embodiment as described above, the "folding-up type" portable telephone set has the receiving and the calling sections which are coupled by a hinge and are capable of opening and closing. However, it is understood that the present invention is not limited to such type of portable telephone set, but can be applied to other folding-up types of telephone sets. "Folding-up" type telephone sets according to the invention are not limited to the type shown in the embodiment, but also includes those having covers or cover shaped members which cover a part of the telephone set at a time of non-use, such as the flip portion of the portable type telephone set disclosed in U.S. Pat. No. 4,845,772. The detector for detecting the open state of the telephone set may preferably use any member which moves in association with the opening/closing operation of the telephone set other than the reed switch shown in the embodiment.

As hereinbefore fully described, according to the present invention, complicated dialling operation of phone numbers stored in memory is eliminated because, when the portable telephone set is opened, an automatic dialling operation is performed for the predetermined subscriber stored in memory.

What is claimed is:

1. A portable telephone set including a memory for storing subscriber dial number information, and a display means for displaying the dial number information read from said memory, at least a part of said telephone set being brought into an opened state from a closed state during use of said portable telephone set, characterized by;

a selecting means for selectively activating an automatic dial mode of operation;

a detecting means for detecting the opened state of the telephone set; and a dialing signal feed means for automatically feeding to a telephone network, dialing signal information of a predetermined subscriber which is read from said memory, upon detection of the opened state of the telephone set by said detecting means if said automatic dial mode of operation has previously been activated by said selecting means.

2. A portable telephone set as claimed in claim 1, wherein said display means displays said dialing signal information of a predetermined subscriber read from the memory.

3. A portable telephone set as claimed in claimed in claim 1, wherein said telephone set comprises a receiving section provided with an earpiece and a calling section provided with a mouthpiece, said receiving section and said calling section are rotatably coupled by a hinge for bringing said telephone set into an opened state from a closed state.

4. A portable telephone set as claimed in claim 1, wherein said detecting means is an electrical switch adapted to turn ON or OFF depending on whether the telephone set is in the closed state or the opened state.

5. A portable telephone set as claimed in claim 1, wherein selection of said automatic dial function by said selecting means is stored in the memory.

6. A portable telephone set including a memory for storing subscriber dial number information, and a display means for displaying the dial number information read from said memory, and at least a part of said telephone set being brought into an opened state from a closed state during use of said portable telephone set, characterized by;

a first selecting means for selectively activating an automatic mode of operation;

a detecting means for detecting the opened state of the telephone set;

a second selecting means for selecting the dial number information of a predetermined subscriber stored in the memory;

a dialing signal feed means for automatically feeding to a telephone network, dial signal information of a predetermined subscriber which is selected by said second selecting means, upon detection of the opened state of the telephone set by said detecting means if said automatic dial mode of operation has previously been activated by said first selecting means and the opened state of the telephone set is detected by said detecting means.

* * * * *

UNITED STATES PATENT AND TRADEMARK OFFICE
CERTIFICATE OF CORRECTION

PATENT NO. : 5,493,604
DATED : February 20, 1996
INVENTOR(S) : Syoji HIRAYAMA

It is certified that error(s) appears in the above-identified patent and that said Letters Patent is hereby corrected as shown below:

Col. 6, line 3-5, delete "and the opened state of the telephone set is detected by said detecting means".

Signed and Sealed this

Twenty-fifth Day of June, 1996

*Attest:*

BRUCE LEHMAN

*Attesting Officer*     *Commissioner of Patents and Trademarks*